US008924578B2

(12) United States Patent
Schmidt et al.

(10) Patent No.: US 8,924,578 B2
(45) Date of Patent: Dec. 30, 2014

(54) METHOD FOR TRANSMITTING MESSAGES IN AN MMS-BASED COMMUNICATION SYSTEM

(75) Inventors: Andreas Schmidt, Braunschweig (DE); Markus Trauberg, Velchede (DE); Klaus von Treufels, Wolfenbüttel (DE)

(73) Assignee: Siemens Aktiengesellschaft, Munich (DE)

( * ) Notice: Subject to any disclaimer, the term of this patent is extended or adjusted under 35 U.S.C. 154(b) by 2250 days.

(21) Appl. No.: 10/559,890

(22) PCT Filed: Apr. 30, 2004

(86) PCT No.: PCT/EP2004/050659
§ 371 (c)(1),
(2), (4) Date: Dec. 6, 2005

(87) PCT Pub. No.: WO2004/109998
PCT Pub. Date: Dec. 16, 2004

(65) Prior Publication Data
US 2006/0209867 A1    Sep. 21, 2006

(30) Foreign Application Priority Data

Jun. 6, 2003  (EP) ..................... 10325889

(51) Int. Cl.
*G06F 15/16*  (2006.01)
*H04L 12/58*  (2006.01)

(52) U.S. Cl.
CPC .............. *H04L 12/587* (2013.01); *H04L 51/24* (2013.01); *H04L 12/5895* (2013.01)
USPC ............................ 709/231; 370/428; 370/490

(58) Field of Classification Search
USPC ............................ 709/206, 231; 370/428, 490
See application file for complete search history.

(56) References Cited

U.S. PATENT DOCUMENTS 5,953,506 A * 9/1999 Kalra et al. .................... 709/231
6,600,732 B1 * 7/2003 Sevanto et al. ................ 370/349
(Continued)

FOREIGN PATENT DOCUMENTS

DE    199 56 023    4/2001
EP    1 113 631    7/2001
(Continued)

OTHER PUBLICATIONS

ETSI TS 123 140, V5.50, Dec. 2002, Digital cellular telecommunications system (Phase 2+), UMTS, MMS, Functional description, Stage 2, Dec. 2002, Fig. 3-6, Abschnitt B.1.4 pp. 120-121.

*Primary Examiner* — Harunur Rashid
(74) *Attorney, Agent, or Firm* — King & Spalding L.L.P.

(57) ABSTRACT

The present disclosure relates to a method for transmitting messages, a transmission message containing one or more useful data objects is first transmitted to a switching component in order to be routed to a second telecommunications device, wherein the transmission is made by a transmitting telecommunications device. A plurality of variants of the one or more useful data objects is created in the switching component in accordance with a set of parameters, the second telecommunications device is then informed of the provision of the plurality of variants of the data objects for transmission to the second telecommunications device. Also, a delivery request message relating to a specific variant of the useful data objects is subsequently sent from the second telecommunications device to the switching component. The switching component then transmits a delivery message containing the requested variant of the useful data objects to the second telecommunications device.

30 Claims, 4 Drawing Sheets

(56) References Cited

U.S. PATENT DOCUMENTS

| | | | |
|---|---|---|---|
| 7,392,038 B1* | 6/2008 | Ratschunas et al. | 455/412.1 |
| 2001/0012302 A1* | 8/2001 | Gaffney | 370/486 |
| 2002/0069298 A1* | 6/2002 | Birkler et al. | 709/248 |
| 2002/0132608 A1* | 9/2002 | Shinohara | 455/412 |
| 2002/0165024 A1* | 11/2002 | Puskala | 463/40 |
| 2003/0027566 A1 | 2/2003 | Weiner | |
| 2003/0096598 A1* | 5/2003 | Prenzel et al. | 455/412 |
| 2003/0154300 A1* | 8/2003 | Mostafa | 709/231 |
| 2004/0044774 A1* | 3/2004 | Mangalik et al. | 709/227 |
| 2005/0265525 A1* | 12/2005 | Tang et al. | 379/88.13 |
| 2006/0019637 A1* | 1/2006 | Becker et al. | 455/412.1 |
| 2006/0109836 A1* | 5/2006 | Goertz et al. | 370/352 |

FOREIGN PATENT DOCUMENTS

| | | |
|---|---|---|
| WO | WO 01/58183 | 8/2001 |
| WO | WO 02/058359 | 7/2002 |
| WO | WO 03/001770 | 1/2003 |
| WO | WO 03/007964 | 9/2003 |
| WO | WO 03/079637 | 9/2003 |

* cited by examiner

METHOD FOR TRANSMITTING MESSAGES IN AN MMS-BASED COMMUNICATION SYSTEM

FIELD OF TECHNOLOGY

The present disclosure relates to a method for transmitting messages and in particular a method for transmitting messages with useful data objects according to the Multimedia Messaging Service (MMS) from one telecommunication device to a further telecommunication device.

BACKGROUND

3GPP ($3^{rd}$ Generation Partnership Project) and the OMA (Open Mobile Alliance) specify the so-called Multimedia Messaging Service (MMS) for transmitting data, in particular multimedia data objects, from a first to a second mobile telephone or mobile radio device in a mobile radio communication network. Should a first user wish to send a second user a useful data object, for example in the form of an image or a music file, the user uses a (first) mobile telephone to send a multimedia message (MM) with the useful data object to a switching component in the communication network, which comprises at least one MMS relay server. A multimedia message (MM) can also contain a plurality of useful data objects. As a special service, the MMS provider can individually adapt the at least one useful data object to be delivered to the characteristics or capabilities of the second mobile telephone before sending a further message (hereafter referred to as a "recipient notification message") to the second mobile telephone of the second user with the information that a multimedia message (MM) with at least one useful data object available for downloading. One disadvantage of such a method is that the recipient (in this instance the second user) of a recipient notification message or a multimedia message (MM) with at least one useful data object is unable to identify whether and how the transmission message (hereafter referred to as the multimedia message (MM)) or the useful data object contained therein has been modified and whether the possibly modified useful data object can still be used.

SUMMARY

Accordingly, the present disclosure describes exemplary embodiments for transmitting useful data objects to a recipient that allows greater control of the useful data objects to be received.

One exemplary method for transmitting messages in a communication network comprises the following steps: First a transmission message with one or more useful data objects or multimedia message elements is transmitted to a switching component for forwarding to a first telecommunication device. This transmission can take place from a sending telecommunication device such as a mobile radio device or a mobile telephone. A plurality of variants of the one or more useful data objects is created in the switching component as a function of a set of parameters. "Variant" here refers to both the original form of the one or more useful data objects and the adapted or modified versions. The first telecommunication device, which again can be a mobile radio device or a mobile telephone, is then informed of the availability of a plurality of variants of the one or more useful data objects for transmission to the first telecommunication device. If a recipient, i.e. a user of the first telecommunication device, selects one or more variants of the useful data objects, a delivery request message relating to a specific variant of the one or more useful data objects is advantageously sent from the first telecommunication device to the switching component. A delivery message with the requested variant of the one or more useful data objects is then transmitted from the switching component to the first telecommunication device. Informing the recipient of the different adapted variants of the useful data objects contained in the transmission message available on the switching component allows the recipient specifically to select and download particular variants of the required useful data objects or the entire transmission message, giving them greater control of the messages or useful data objects they are to receive. Information about the useful data objects available on the switching component also allows the recipient to decide not to initiate a download process at all, if the useful data objects are not of use, or if the download process would be very expensive. It is thereby possible to prevent useful data objects being downloaded (from the switching component) to the first telecommunication device if they cannot be used by the telecommunication device and also possible to specifically download useful data objects, the size of which has been minimized, thereby minimizing download costs and also allowing a larger number of useful data objects to be stored on the first telecommunication device. The described method also allows the recipient to decide, on the basis of the information about the useful data objects available on the switching component, specifically to download useful data objects which, although they cannot be played back by the second telecommunication device, may be able to be played back by a further device connected to the second telecommunication device either by cable, infrared interface (e.g. IrDA) or radio (e.g. Bluetooth). One possible application is the downloading of a high-quality image file by the second telecommunication device, said file then being printed out using an external printer.

According to an advantageous embodiment, the recipient or first telecommunication device is informed as follows: Recipient notification messages assigned to a specific variant of the one or more useful data objects are generated by the switching component and these respective recipient notification messages are transmitted from the switching component to the first telecommunication device.

According to a further advantageous embodiment, the set of parameters, as a function of which the plurality of variants of the one or more useful data objects is created, includes parameters with information about the individual characteristics of the telecommunication device. The individual characteristics of the telecommunication device can also include characteristics of applications provided on the telecommunication device. The set of parameters can also include parameters with information about the individual preferences of the recipient or the set of parameters can include parameters with descriptive information including the significance of useful data objects contained in the transmission message and/or the relationship of the contained useful data objects to each other (so-called metadata, for example according to the MPEG-7 standard).

According to the embodiment, the messages are transmitted in the context of the multimedia messaging service (MMS) between the first telecommunication device, the switching component and the second telecommunication device. This allows the transmission of useful data objects that can also include multimedia content such as digital images, video clips or large audio or music files.

Furthermore, the first telecommunication device and any further telecommunication devices as well as the switching component are preferably part of a telecommunication network. The telecommunication device or further telecommunication devices can thereby be part of a first telecommunication network (in the case of a plurality of telecommunication devices however these do not have to be part of the same telecommunication network). The switching component, which is configured in particular as a server of a data transmission service, such as an MMS relay server, can correspondingly be provided in a second telecommunication network, which is connected to the telecommunication network(s), which is/are assigned to the telecommunication device or further telecommunication devices. This second telecommunication network can be configured in particular as a telecommunication network based on internet protocols, such as the hypertext transfer protocol.

In order to be able to use the method for transmitting useful data objects as flexibly as possible, the messages to and from the first and/or second telecommunication device can be sent via an air interface, whereby the telecommunication device (or even the further telecommunication devices) can preferably be configured as a mobile telecommunication device and can thereby comprise a radio module or mobile radio module in particular. The transmission of messages to and from a respective telecommunication device can then take place on the basis of the WAP wireless session protocol (WSP) or the hypertext transfer protocol (http). The telecommunication device can thereby be configured as a mobile radio device or mobile telephone, a cordless telephone, a smartphone (combination of a small portable computer and a mobile telephone), a PDA (personal digital assistant) or an organizer. The telecommunication device can also include other devices with mobile access such as a personal computer (PC) or a laptop, which can be accessed via a mobile radio network by means of a connected mobile radio device (mobile telephone). The mobile radio device can then be connected via a cable to the personal computer or laptop or can even contact these wirelessly via an infrared interface or a local Bluetooth network. A telecommunication device, such as the mobile radio device, including the telecommunication network assigned to it, can thereby operate in the form of a mobile radio network according to the GSM (Global System for Communication) standard or the UMTS (Universal Mobile Telecommunications System) standard, etc. Such mobile radio networks or telecommunication devices according to the GSM or UMTS standard can represent a platform for WAP (Wireless Application Protocol) protocols or the WAP protocol stack, by means of which data (notifications or useful data objects) can be transmitted in the respective mobile radio network.

The first and second telecommunication networks are preferably connected together by means of a connecting component. If the WAP protocol stack is used, as mentioned above, it is possible to create a connection to this, by using a WAP gateway as the interface or connecting component between a mobile radio network and another network, for example an internet protocol-based network. This makes it possible for the switching components to be located in an internet protocol-based network, such as the internet, whereby the data (messages, useful data objects) can be transmitted via a WAP gateway and ultimately via an air interface of a mobile radio network between the base station(s) of the mobile radio network and to the respective user telecommunication devices. It should be mentioned here that in the context of the MMS data transmission service, messages can be sent from the MMS relay server as the switching component automatically, i.e. without prompting a telecommunication device, to a telecommunication device by means of WAP push. The MMS relay server hereby serves as a so-called push initiator, activating the WAP gateway or a sub-component thereof, namely the push proxy gateway, to send a message by WAP push to the telecommunication device. For example according to the MMS transmission service the recipient notification message is transmitted by WAP push to the telecommunication device.

It should be pointed out that the useful data objects can generally include audio information, video information, executable programs, software modules or a combination of such information.

According to a further embodiment a telecommunication arrangement is created comprising a switching component and at least a first telecommunication device, the telecommunication arrangement being configured to implement a method as set out above.

BRIEF DESCRIPTION OF THE DRAWINGS

The various objects, advantages and novel features of the present disclosure will be more readily apprehended from the following Detailed Description when read in conjunction with the enclosed drawings, in which.

DETAILED DESCRIPTION

Before going on to describe a method for transmitting messages, in particular by means of the MMS (Multimedia Messaging Service), from one telecommunication device to a second telecommunication device according to a preferred embodiment of the invention, it is necessary once again to describe the basic components or network structures for implementing an MMS service.

For next generation mobile systems (2.5G and 3G), such as systems operating according to the UMTS (Universal Mobile Telecommunications System) standard, a multimedia-enabled variant of a mobile message service is at present standardized, namely the MMS service or MMS. MMS messages with multimedia content are referred to below, for a clearer distinction from SMS (Short Message Service) text messages, simply as MMs (Multimedia Messages). Unlike SMS there is no restriction to pure text content. With MMS it is possible to format texts to individual tastes and to embed audio and video content in a message. An MM can therefore contain a number of MM elements or useful data objects of different file types (e.g. audio or stills) or file formats (e.g. GIF or JPEG for stills). A temporally defined sequence of small presentations is also possible.

Figure 1:
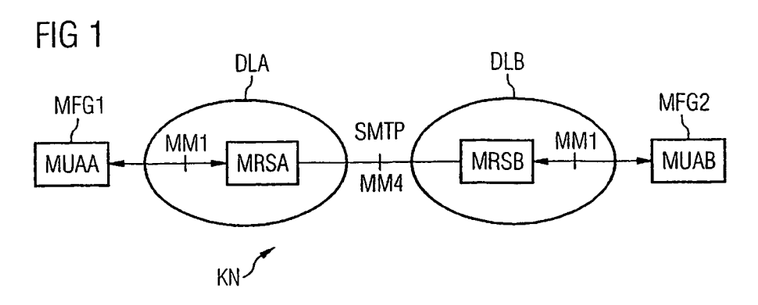
FIG. 1 shows a schematic illustration of a communication network or telecommunication network for implementing an MMS system, in which two service providers are provided for an MMS environment.

FIG. 1 shows a possible telecommunication arrangement or network architecture KN for implementing the MMS, in particular according to a 3GPP (3$^{rd}$ Generation Partnership Project) specification. On the left of the figure is a first telecommunication device configured as a first mobile radio device MFG1, which is connected via an interface, more precisely an air interface, as will be described in more detail with reference to FIG. 2, to a communication network (to illustrate the most important components of the network more simply, it is not described in more detail here that and how the air interface is set up to a base station of a mobile radio network, which is in turn connected to the communication network or a first MMS network environment DLA. The same also applies of course to the connection to the second mobile radio device described below). More precisely the first mobile radio device MFG1 is connected to a first MMS network environment DLA (MMSE: Multimedia Messaging Service Environment), which is in the area of responsibility of a first MMS provider. A software application, a so-called MMS user software application or MMS user agent MUAA, is provided on the mobile radio device MFG1 to implement the terminal-side element for the MMS. A so-called first MMS relay server MRSA is provided in the first MMS network environment DLA to provide the MMS functionality for the telecommunication devices or telecommunication terminals connected to the first MMS network environment.

The first MMS network environment DLA is connected in the example to a second MMS network environment DLB of a second MMS provider via an interface MM4 (see further description relating to FIG. 2), implemented for example via the SMTP (Simple Mail Transfer Protocol) protocol. A second MMS relay server MRSB is provided in the second MMS network environment to provide the MMS functionality for telecommunication devices or telecommunication terminals, such as the mobile radio device MFG2, connected to the second MMS network environment DLB. A software application is again provided on the mobile radio device MFG2, in this instance an MMS user application (MMS user agent) MUAB to implement the terminal-side element for the MMS. If multimedia messages are to be transmitted, in particular with useful data objects, from the mobile radio device MFG1 to the mobile radio device MFG2, the two MMS relay servers MRSA and MRSB can be combined in the MMS network environments DLA and DLB to form a switching component, as will be described later with reference to FIG. 3.

It is a characteristic feature of MMS that, for delivery of multimedia messages (MMs) to a receive device (mobile radio device), it is possible to decide between so-called PUSH mode, in which an incoming message is transmitted immediately by an MMS relay server to the MMS user application of the receive device, and so-called PULL mode, in which the recipient or receive device is first informed about a multimedia message that has just arrived at the MMS relay server by means of an MMS notification or recipient notification message and can then itself decide whether or when it will download said multimedia message to its mobile radio device from the MMS relay server.

Figure 2:
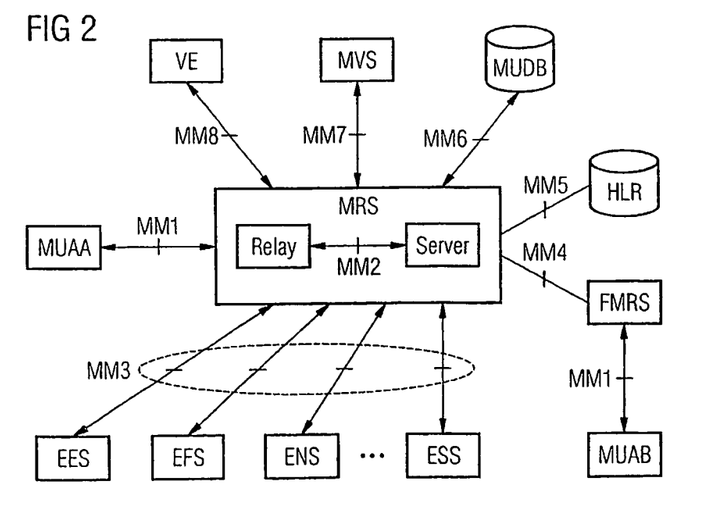
FIG. 2 shows a schematic illustration of exemplary interfaces of an MMS relay server.

Possible defined interfaces for connecting further network elements or network components to an MMS relay server MRS, such as the MMS relay server MRSA or MRSB, are shown in FIG. 2. In addition to an interface MM1, via which an MMS user application MUAA and an MMS relay server are connected, any external servers, such as email servers EES, fax servers EFS, further message servers e.g. for UMS (Unified Message Services) ENS or other servers ESS, etc. can be connected to the MMS relay server MRS via interfaces MM3. External or "foreign" MMS providers are connected via an interface MM4, as already stated with reference to FIG. 1. An interface MM5 connects the MMS relay server MRS to the HLR (Home Location Register) of a mobile radio network operator, in which the individual customer data or user data of every mobile radio subscriber is stored (the HLR is generally located in the area of responsibility of the network operator, who does not necessarily have to be the same as the MMS provider). An interface MM6 allows the connection of one or more MMS user databases MUDB. Interface MM7 allows the connection of servers MVS operated by a VASP (Value Added Service Provider), which provide value added services to MMS users. A further interface MM8 is provided for connecting a network unit or charging unit VE to the MMS relay server MRS, in which all the information of relevance to charging for the MMS is collected and evaluated. Interface MM2 provides a connection between relay and server in the MMS relay server MRS.

The exchange of data, in particular of useful data objects, between the MMS units or MMS data transmission units shown in FIG. 1 during transmission of a multimedia message MMA with multimedia message elements MME from the mobile radio device MFG1 and receipt by the mobile radio device MFG2 based on so-called abstract messages as defined according to the 3GPP is described in more detail below with reference to FIG. 3. An abstract message comprises at least one information element. When the MMS is used, a sender, in this instance the mobile radio device MFG1 or the MMS user application MUAA, can send a multimedia message MMA via the air interface MM1 to the MMS relay server MRSA of its MMS provider with the abstract message (also referred to below as a transmission message) "MM1_submit.REQ". The MMS relay server MRSA confirms correct receipt of the multimedia message from the MMS user application MUAA with the abstract message "MM1_submit.RES". The MMA is transmitted to the MMS relay server MRSB in the MMS environment DLB (see FIG. 1) of the recipient or destination mobile radio device with the abstract message pair "MM4_forward.REQ" (contains the actual multimedia message) and "MM4_forward.RES" (which sends a return message or confirmation back to the MMS relay server MRSA). The receive device MFG2 or its MMS user application MUAB is then informed of the multimedia message MMA available for downloading on the MMS relay server MRSB with the abstract message or recipient notification message "MM1_notification.REQ". This MMS recipient notification message contains the URI (Uniform Resource Identifier) of the storage location of the multimedia message on the MMS relay server MRSB as reference. The abstract message "MM1_notification.RES" primarily serves as confirmation of the correct receipt of the recipient notification message at the MMS user application MUAB and to inform the MMS provider of the nature of delivery required (PUSH or PULL mode). The recipient, namely the MMS user application MUAB, can use the abstract message or delivery request message "MM1_retrieve.REQ" to initiate the downloading of a multimedia message MMA available on the MMS relay server MRSB. The multimedia message MMA is delivered from the MMS relay server MRSB to the MMS user application MUAB by means of the abstract message or delivery message "MM1_retrieve.RES". The MMS relay server MRSB can be informed by the MMS user application MUAB of the outcome of the download of the multimedia message MMA with the abstract message "MM1_acknowledgement.REQ". It should be noted that for a simple illustration of the transmission of a multimedia message from the mobile radio device MFG1 via the two MMS relay servers MRSA and MRSB to the mobile radio device MFG2, the two MMS relay servers MRSA and MRSB can also be seen as one switching component VK between the mobile radio devices. If the mobile radio device MFG2 was also in the effective area of the MMS environment of the first MMS provider, the switching component VK would only comprise the MMS relay server MRSA.

Figure 4:
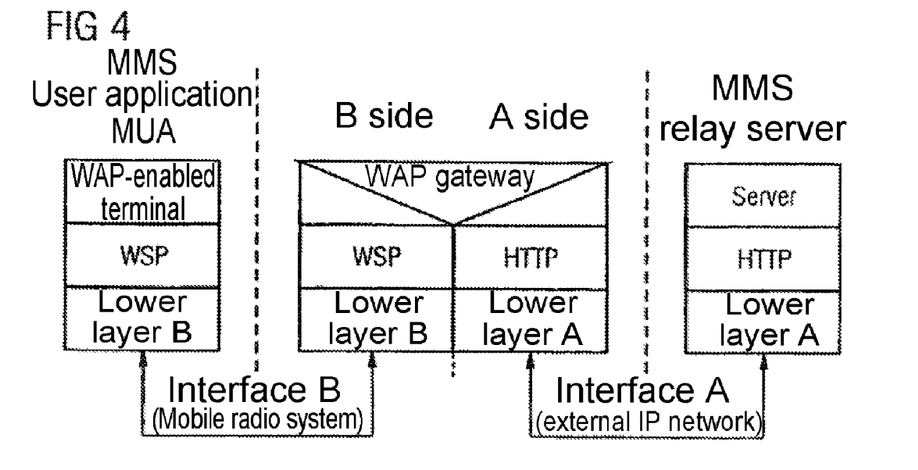
FIG. 4 shows a detailed illustration of the interface MM1 shown in FIG. 2, in which a WAP gateway ensures the adaptation of the MMS useful data to the two different session layer protocols (WSP and HTTP)

If a mobile radio network operator deploys a WAP implementation of MMS in the PLMN (Public Land Mobile Network), the interface MM1 as described above preferably comprises two sections connected together by a special network component, such as a WAP (Wireless Application Protocol) gateway. The WAP gateway between an MMS relay server of an MMS provider and the core network of a mobile radio system or mobile radio network primarily has the task of adapting the data to be transmitted to the different protocol layers on both sides. To explain this more clearly, FIG. 4 shows a detailed configuration of the interface MM1 for the WAP implementation of MMS between a mobile telecommunication terminal, such as a mobile radio device, with an MMS user application MUA and an MMS relay server MRS. On the "A side" (in the direction of an external IP (internet protocol) network) the session layer protocol used is http (hypertext transfer protocol) and on the "B side" (in the direction of a mobile radio system or mobile radio network, PLMN) WSP (Wireless Session Protocol) is used.

Accordingly, an MMS provider may individually adapt a the multimedia message to be delivered or the useful data objects contained therein before sending an MMS recipient notification or recipient notification message. Such an adaptation can be based on the individual characteristics of the receive device, the individual user settings or any descriptive information contained in a multimedia message or obtained from a multimedia message (so-called metadata, for example according to the MPEG-7 standard). Combinations of these three options are also possible. This is described in more detail below.

1. Adaptation of a multimedia message or the useful data objects contained therein according to the individual characteristics of the receive device: mobile radio devices, such as mobile telephones, are generally differentiated on the basis of their characteristics or capabilities. The characteristics of the display devices can sometimes vary significantly for example (e.g. in size and resolution), as can their capabilities in respect of displaying and/or processing certain file types and/or file formats. So that a mobile radio network operator or service provider can know the characteristics or capabilities of a WAP-enabled terminal, the WAP Forum has standardized the so-called UA Prof (User Agent Profile), with which the appropriate characteristic device profile can be assigned on the network side to every individual terminal or mobile radio device registered in the mobile radio network.

WAP UA Prof may also be used with the MMS as follows: If a mobile radio customer or mobile radio user has a terminal or mobile radio device with a WAP-based MMS user application and is registered to use the MMS with an MMS provider, MMS-specific inputs will also represent a subset of the UA Prof or user profile (e.g. maximum size of incoming multimedia messages, etc.). The MMS relay server can access the user profile information via the interface MM6 shown in FIG. 2 (MMS relay server to MMS user database(s) MUDB). If an MMS provider has knowledge of the individual characteristics or capabilities of a mobile telecommunication terminal (e.g. mobile radio device) and an MMS user application (MMS user agent) installed thereon, the MMS relay server can specifically convert individual multimedia message elements or useful data objects to file types or formats suitable for the recipient's terminal before transmitting an MMS recipient notification (recipient notification message), so that the multimedia message can be displayed in an optimum fashion on the recipient's terminal.

2. Adaptation of a multimedia message according to individual user settings: In the MMS every user can apply settings on the network side, thereby configuring the MMS to their individual preferences. For example a user setting could be that all incoming multimedia messages containing multimedia message elements or useful data objects of a specific data type are automatically forwarded without an MMS recipient notification (recipient notification message) to an email address.

3. Adaptation of a multimedia message according to the metadata contained in a multimedia message: Descriptive information (so-called metadata) may also be contained in a multimedia message or be obtained from a multimedia message and this can be used to clarify the significance of individual multimedia message elements (useful data objects) and express dependencies between the individual multimedia message elements (useful data objects). For example a multimedia message element (useful data object) of the type "text" could be identified as the main component, a multimedia message element of the type "still" as the background image or a multimedia message element of the type "audio" as a (spoken) commentary relating to the still.

An incoming multimedia message can be adapted in the MMS relay server in the recipient-side MMS environment on the basis of the three data records described above (and combinations thereof) before transmission of the MMS recipient notification (recipient notification message).

So that the recipient has greater control of the multimedia message to be received and the useful data objects contained therein and receives information about whether and how a multimedia message or the elements or useful data objects contained therein has/have been adapted, the following is proposed according to an embodiment of the invention.

In the exemplary embodiment a number of alternative MMS recipient notifications (recipient notification messages) can be sent to the recipient for differently adapted variants of the same multimedia message. This gives the recipient a number of alternative options for downloading the same multimedia message. Variant here refers both to the original message and the useful data objects contained in the original message as well as the adapted message and the adapted useful data objects.

To achieve this, a backward-compatible mapping mechanism allows assignment of the individual MMS recipient notifications (recipient notification messages) to a multimedia message in the MMS user application of the recipient.

It is also possible to pack the information about the different download options for the individual variants into a single, newly defined multipart MMS recipient notification but backward-compatibility would then not be possible. An old or conventional MMS user application (MMS user agent) could not start anything with the new and to it unknown structure of a multipart MMS recipient notification.

So that the alternative options for downloading an MM (in the different variants) are possible in a fashion that can easily be understood by the recipient, a possible configuration of the HMI (Human Machine Interface, for example in the form of a display) on the side of the receiving MMS user application (MMS user agent) is described below according to the disclosed embodiment.

To improve the control options when downloading a multimedia message, a number of download options for the same multimedia message are preferably offered or transmitted to a recipient or a receiving device by creating and sending a number of different MMS recipient notifications (recipient notification messages) for variants of a multimedia message adapted differently on the network side (in particular by the MMS relay server of the MMS environment of the recipient's MMS provider) based on at least one of the following data records:

i) Information about the individual characteristics or capabilities of the mobile telecommunication terminal, such as a mobile radio device or mobile telephone, and the MMS user application (MMS user agent) installed thereon or connected thereto. The information about the individual characteristics or capabilities of a telecommunication terminal or a telecommunication device and the MMS user application (MMS user agent) in this respect could for example be configured according to a WAP user profile or WAP UA Prof and could possibly originate from previous WSP sessions, i.e. earlier MMS download processes;

ii) Information about the individual preferences of the MMS user. The information about the individual user preferences in this respect could for example be a component of the MMS user database(s) MUDB (see also FIG. 2); and/or iii) Descriptive information (so-called metadata), which clarifies the significance of individual multimedia message elements (useful data objects) and/or expresses relationships or dependencies between individual multimedia message elements. The descriptive information (metadata) in this respect could for example be configured according to MPEG-7 and could possibly be contained as an independent multimedia message element (useful data object) in the multimedia message or be obtained by the adapting MMS relay server from an incoming multimedia message.

The use of a backward-compatible mapping mechanism for MMS recipient notifications (recipient notification messages) also serves to improve control options:

a) Associated MMS recipient notifications are advantageously identified by an additional newly defined header field in the adapting MMS relay server before delivery to the recipient's MMS user application;

b) A sequence number can also be advantageously used (again in a newly defined header field) in order to be able to establish in the recipient's MMS user application whether all the associated MMS recipient notifications have arrived. It should also be clear from the sequence information in the respective different recipient notification messages which of the MMS recipient notifications relate to the unmodified original version of the at least one useful data object. For example the value "0" for the sequence number could indicate the original version, while values >0 indicate adapted/modified versions of useful data objects or transmission messages (i.e. multimedia messages MM);

c) Also, the individual MMS recipient notifications can be assigned in the recipient's MMS user application (MMS user agent) based on identification numbers and sequence numbers.

As an alternative to a) and b), the ID for associated MMS recipient notifications and/or the sequence number and/or a maximum number indicating the total number of variants provided or the total number of MMS recipient notifications generated or sent could also be specially coded and integrated into an already known header field (for example as an additional parameter).

The control options and the information to a recipient of a multimedia message can also be further improved by displaying the information from the individual MMS recipient notifications relating to alternative download options, i.e. for different variants of a multimedia message or its useful data objects, in a user-friendly fashion by means of a particularly advantageous configuration of the HMI in the recipient MMS user application (MMS user agent).

Further are described below to clarify the aspects mentioned above relating to improving the control options when downloading multimedia messages available on an MMS relay server:

A. Provision of Alternative Download Options

Alternative download options may be provided for the same multimedia message by creating and sending a plurality of different MMS recipient notifications (recipient notification messages) for variants of a multimedia message adapted or processed differently on the network side.

The examples below are all based on the assumption that an exemplary multimedia message, comprising three multimedia message elements or useful data objects (MME), namely a 20 kB text, an image with 8 bit color depth and a 30 kB voice note is to be sent from a sender (i.e. from a first telecommunication device, such as a mobile radio device) to a recipient (i.e. a second telecommunication device, such as a second mobile radio device), as already described with reference to FIG. 3. However in contrast to the description above with reference to FIG. 3, at least one useful data object is now adapted or modified as a function of the information described under points i) to iii) in the MMS environment of the recipient's MMS provider, in particular in their MMS relay server (with reference to FIG. 3 this would be the MMS relay server MRSB, if the multimedia message MMA is sent by the mobile radio device MFG1), before transmission of the at least one MMS recipient notification (recipient notification message).

EXAMPLE 1

Creation of a Plurality of MMS Recipient Notifications for One Multimedia Message (MMA) Based on the Individual Characteristics or Capabilities of the Mobile Telecommunication Terminal and the MMS User Application (MMS User Agent)

Figure 3:
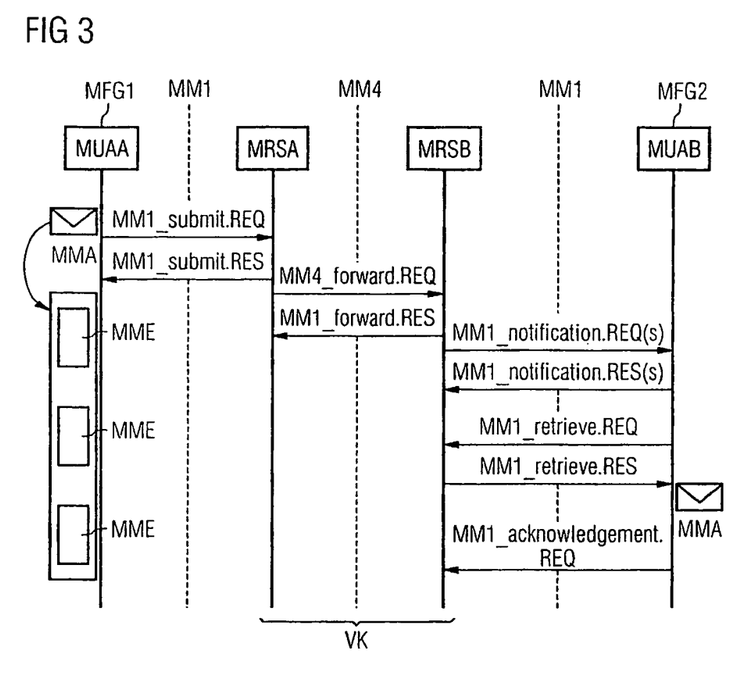
FIG. 3 shows an exemplary flow diagram for transmitting a multimedia message from a mobile radio device to a second mobile radio device.

The MMS relay server (using to the above assumption the MMS relay server MRSB, see FIG. 3) is to deliver the exemplary multimedia message (MMA) to the MMS user application (MMS user agent) MUAB of the recipient, the mobile radio device MFG2. In a data record stored on the network side (see point i above) containing the individual characteristics and capabilities of the mobile radio device MFG2 and the MMS user application MUAB it is noted that the receive device MFG2 can only display black and white images in the example. The user (of the mobile radio device MFG2) may however still wish to download a color image from the MMS relay server MRSB, wishing to print out the multimedia message element (useful data object) in color later.

The MMS relay server (MRSB) of the exemplary embodiment now creates a further multimedia message variant with a different color depth for the image or image data object from the original, according to the rules of the data record with the individual characteristics and capabilities of the mobile telecommunication terminal, in addition to the received multimedia message (MMA). This is shown in table 1 below, in which the MMS relay server has created an adapted multimedia message variant 1B from the original multimedia message variant 1A, having a black and white image with a different depth of color instead of the color image. The multimedia messages elements of the types "text" and "audio" remain the same:

TABLE 1

|  | MM variant 1A | MM variant 1B |
| --- | --- | --- |
| Text | Original | Original |
| Text size | 20 kB | 20 kB |
| Image | Original | Modified |
| Resolution | 100 × 80 pixels | 100 × 80 pixels |
| Depth of color | 8 bit | 2 bit |
| Image size | 8 kB | 2 kB |
| Audio | Original | Original |
| Audio size | 30 kB | 30 kB |

In a next step the MMS relay server MRSB creates a specific MMS recipient notification for the original multimedia message variant 1A and the newly generated multimedia message variant 1B respectively. Both MMS recipient notifications refer to the same content in principle, which is now present in two differently adapted variants. Each multimedia message variant is referred to by its own URI. The respective MMS recipient notifications "MM1_notification.REQ(s)" are then sent, as shown in FIG. 3, from the MMS relay server MRSB to the receive terminal MFG2 (adding "(s)" to "MM1_notification.REQ" in FIG. 3 indicates that according to the embodiment of the invention a plurality of MMS recipient notifications or recipient notification messages are now sent to the recipient based on one multimedia message (MMA)).

EXAMPLE 2

Creation of a Plurality of MMS Recipient Notifications for One Multimedia Message (MMA) Based on the Individual Preferences of the MMS User Again with reference to FIG. 3 the MMS relay server MRSB is to deliver the exemplary multimedia message MMA to the MMS user application (MMS user agent) MUAB of the recipient or mobile radio device MFG2. In it the example is marked in a data record stored on the network side and containing the individual preferences of the MMS user (according to point ii)) that all the images contained in a multimedia message should be scaled down in two user-defined stages before delivery of the multimedia message (a depth of color reduction would of course also be possible). The recipient may apply these settings to minimize the data volume as far as possible both when delivering the multimedia message via the interface MM1 and when storing the multimedia message in their mobile telecommunication device. This could reduce download costs (depending on the MMS provider's charging model) and also means that a larger number of multimedia messages could be stored in the receive terminal. The MMS relay server MRSB now creates two further variants 2B and 2C according to the rules of the data record with the individual preferences in addition to the received original multimedia message MMA (multimedia message variant 2A) (more precisely variants of the image or image object are generated, the text and audio objects remaining in the original form). These further variants differ in image format, as shown in table 2 below:

TABLE 2

|  | MM variant 2A | MM variant 2B | MM variant 2C |
| --- | --- | --- | --- |
| Text | Original | Original | Original |
| Text size | 20 kB | 20 kB | 20 kB |
| Image | Original | Modified | Modified |

TABLE 2-continued

|  | MM variant 2A | MM variant 2B | MM variant 2C |
| --- | --- | --- | --- |
| Resolution | 100 × 80 pixels | 75 × 60 pixels | 50 × 30 pixels |
| Image size | 8 kB | 4.5 kB | 1.5 kB |
| Audio | Original | Original | Original |
| Audio size | 30 kB | 30 kB | 30 kB |

In a next step the MMS relay server MRSB creates a specific MMS recipient notification for the original multimedia message variant 2A and the two newly generated multimedia message variants 2B and 2C respectively. All three refer to the same content in principle, which is now present in three different or adapted variants. Each multimedia message variant is referred to by its own URI. The respective MMS recipient notifications "MM1_notification.REQ(s)" are then sent, as shown in FIG. 3, from the MMS relay server MRSB to the receive terminal MFG2 (adding "(s)" to "MM1_notification.REQ" in FIG. 3 again indicates that according to the embodiment of the invention a plurality of MMS recipient notifications or recipient notification messages are now sent to the recipient based on one multimedia message (MMA)).

EXAMPLE 3

Creation of a Plurality of MMS Recipient Notifications for One Multimedia Message (MMA) Based on Metadata (Significance or Dependencies Between Individual Multimedia Message Elements or Useful Data Objects)

Again with reference to FIG. 3 the MMS relay server is to deliver the exemplary multimedia message MMA to the MMS user application (MMS user agent) of the recipient or the receive device MFG2. The descriptive information (see point iii)) clarifies the relationship of the individual multimedia message elements (useful data objects) in the example as follows: The text or text object is the main message and is independent of the other two multimedia elements. The multimedia message element of the type "audio" contains a spoken commentary relating to the multimedia message element of the type "image" or "still" and is meaningless without the image. (For example: "If you look closely you can see our holiday home in the background"). The receive terminal MFG2 may not be able to display images. (Ideally this information would be a component of the individual characteristics and capabilities of the mobile radio device MFG2 and the MMS user application (MMS user agent) MUAB according to example 1). The MMS relay server MRSB can now identify from the metadata that the audio object or audio file is pointless to the recipient without the still and can generate one or more correspondingly adapted multimedia message variants and invite the user to download according to table 3 below:

TABLE 3

|  | MM variant 3A | MM variant 3B | MM variant 3C |
| --- | --- | --- | --- |
| Text | Original | Original | Original |
| Text size | 20 kB | 20 kB | 20 kB |
| Image | Original | Deleted | Deleted |
| Resolution | 100 × 80 pixels | n/a | n/a |
| Image size | 8 kB | n/a | n/a |
| Audio | Original | Original | Deleted |
| Audio size | 30 kB | 30 kB | n/a |

In a next step the MMS relay server MRSB creates a specific MMS recipient notification or recipient notification message for the original multimedia message variant 3A and the two newly generated multimedia message variants 3B and 3C respectively. All refer to the same content in principle, which is now present in three differently adapted variants. Each multimedia message variant is referred to by its own URI. The respective MMS recipient notifications "MM1_notification.REQ(s)" are then sent, as shown in FIG. 3, from the MMS relay server MRSB to the receive terminal MFG2 (adding "(s)" to "MM1_notification.REQ" in FIG. 3 again indicates that according to the embodiment of the invention a plurality of MMS recipient notifications or recipient notification messages are now sent to the recipient based on one multimedia message (MMA)).

B. Use of a Backward-Compatible Mapping Mechanism for MMS Recipient Notifications Again with reference to FIG. 3 and in particular further to the examples mentioned above under point A, which identify different MMS recipient notifications "MM1_notification.REQ(s)" as associated in the MMS user application (MMS user agent) of the recipient, the MMS relay server MRSB assigns a unique identification number for every originally received multimedia message and extends this together with a maximum number, i.e. a total number of generated or sent MMS recipient notifications, and an optional sequence number for the MMS recipient notifications in every individual MMS recipient notification. The individual MMS recipient notifications or recipient notification messages "MM1_notification.REQ(s)" are then sent in a conventional manner to the MMS user application (MMS user agent) of the recipient or receive device. All the associated MMS recipient notifications "MM1_notification. REQ(s)" can now be displayed there in a manner that is convenient for the user on the basis of the identification number added by the MMS server relay. By counting the received associated MMS recipient notifications and then comparing the resulting value with the maximum number, the MMS user application (MMS user agent) of the receive device (in this instance the mobile radio device MFG2) is able to establish in a simple fashion whether all the associated MMS recipient notifications "MM1_notification.REQ(s)" have arrived.

By way of an example of implementation of the MMS using WAP below, the individual MMS recipient notifications are shown in text coding according to example 2 under point A, in which the image size of a multimedia message element (useful data object) of the type "still" or "image" is reduced in two stages. It should be pointed out that in WAP the "M-Notification.ind" PDU (Protocol Data Unit) corresponds to the above-mentioned abstract message "MM1_notification.REQ" according to 3GPP. According to this embodiment, new headers are inserted into the MMS recipient notifications in boxes for the identification number and the sequence number. More precisely the notification 1 shows an MMS recipient notification (WAP-PDU-"M-Notification.ind") for the multimedia message variant 2A (large image), the notification 2 shows an MMS recipient notification (WAP-PDU-"M-Notification.ind") for the multimedia message variant 2B (medium size image) and the notification 3 shows an MMS recipient notification (WAP-PDU-"M-Notification.ind" for the multimedia message variant 2C (small image).

Notification 1:

X-Mms-Message-Type: m-notification-ind
X-Mms-Transaction-ID: abc10
X-Mms-Version: 1.0
From: andreas.st.schmidt@siemens.com -continued Subject: A multimedia message
X-Mms-Message-Class: Personal
X.Mms-Message-Size: 58000
X-Mms-Expiry: 36000
X-Mms-Variant-Id: example-xyz
X-Mms-Max-Notifications: 3
X-Mms-Sequence-Number: 1
X-Mms-Content-Location: http://operator.de/inbox/mm-id-2A Notification 2:

X-Mms-Message-Type: m-notification-ind
X-Mms-Transaction-ID: abc12
X-Mms-Version: 1.0
From: andreas.st.schmidt@siemens.com
Subject: A multimedia message
X-Mms-Message-Class: Personal
X.Mms-Message-Size: 54500
X-Mms-Expiry: 36000
X-Mms-Variant-Id: example-xyz
X-Mms-Max-Notifications: 3
X-Mms-Sequence-Number: 2
X-Mms-Content-Location: http://operator.de/inbox/mm-id-2B Notification 3:

X-Mms-Message-Type: m-notification-ind
X-Mms-Transaction-ID: abc16
X-Mms-Version: 1.0
From: andreas.st.schmidt@siemens.com
Subject: A multimedia message
X-Mms-Message-Class: Personal
X.Mms-Message-Size: 51500
X-Mms-Expiry: 36000
X-Mms-Variant-Id: example-xyz
X-Mms-Max-Notifications: 3
X-Mms-Sequence-Number: 3
X-Mms-Content-Location: http://operator.de/inbox/mm-id-2C It should be pointed out that the principle described can also be applied not only to simple or simplified MMS recipient notifications with the basic information but also to detailed MMS recipient notifications, which contain more detailed descriptions of the individual multimedia message elements. The benefit of this invention for such detailed MMS recipient notifications can thereby be even greater.

It is also possible according to an advantageous embodiment for the unique identification number of the multimedia message, the maximum number and the sequence number to be contained in code in the URI (preferably in the last part of the path details).

C. User-Friendly Display of Information from the Individual MMS Recipient Notifications Relating to Alternative Download Options by Means of a Particularly Advantageous Embodiment of the HMI in the MMS User Application (MMS User Agent)

As mentioned above, the method described above provides a particularly advantageous embodiment of the menu guide in the MMS user application of the receive device, as the MMS user application:

identifies associated MMS recipient notifications for different variants of a multimedia message based on the unique identification number; and knows from the maximum number how many multimedia message variants the MMS relay server has provided for a specific multimedia message (identified by the same identification number); and identifies from the sequence number which MMS recipient notification belongs to the multimedia message originally received by the MMS server (without adaptation).

Figure 5:
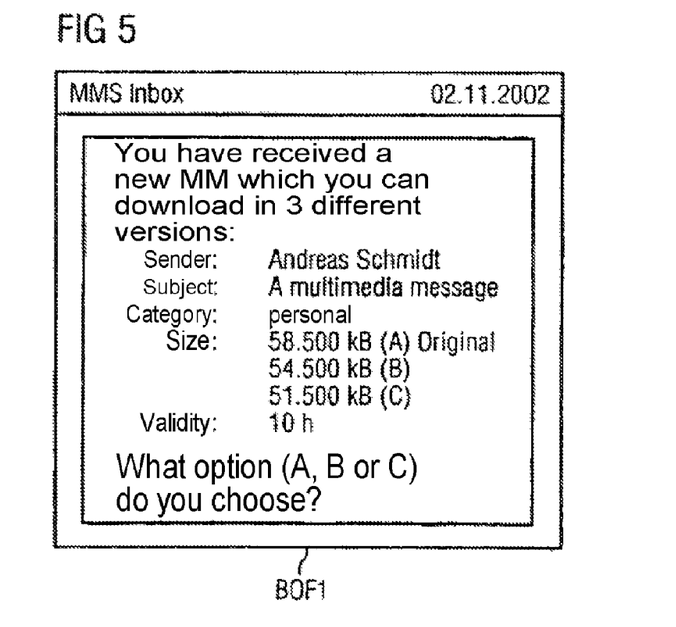
FIG. 5 illustrates a section of a user interface of a telecommunication device for displaying the options or information provided in recipient notification messages according to a first embodiment.

FIG. 5 shows a first exemplary user interface BOF1 displayed on a display unit of the receive device, on which interface the respective MMS recipient notifications or recipient notification messages from example 2 described above under point A are processed and the information contained in them is clearly displayed. It is now shown that there is a multimedia message with three alternative variants or download options in the MMS inbox dated Feb. 11, 2002. The sender, subject of the message, category, size of the modified multimedia message element (in this instance the image) and validity of the multimedia message are also shown. Finally the user of the receive device is prompted to select a variant of the multimedia message element or multimedia message. The required download option can be selected by pressing the corresponding key on a keypad of the receive device (the mobile radio device MFG2 in the example in FIG. 3).

Figure 6:
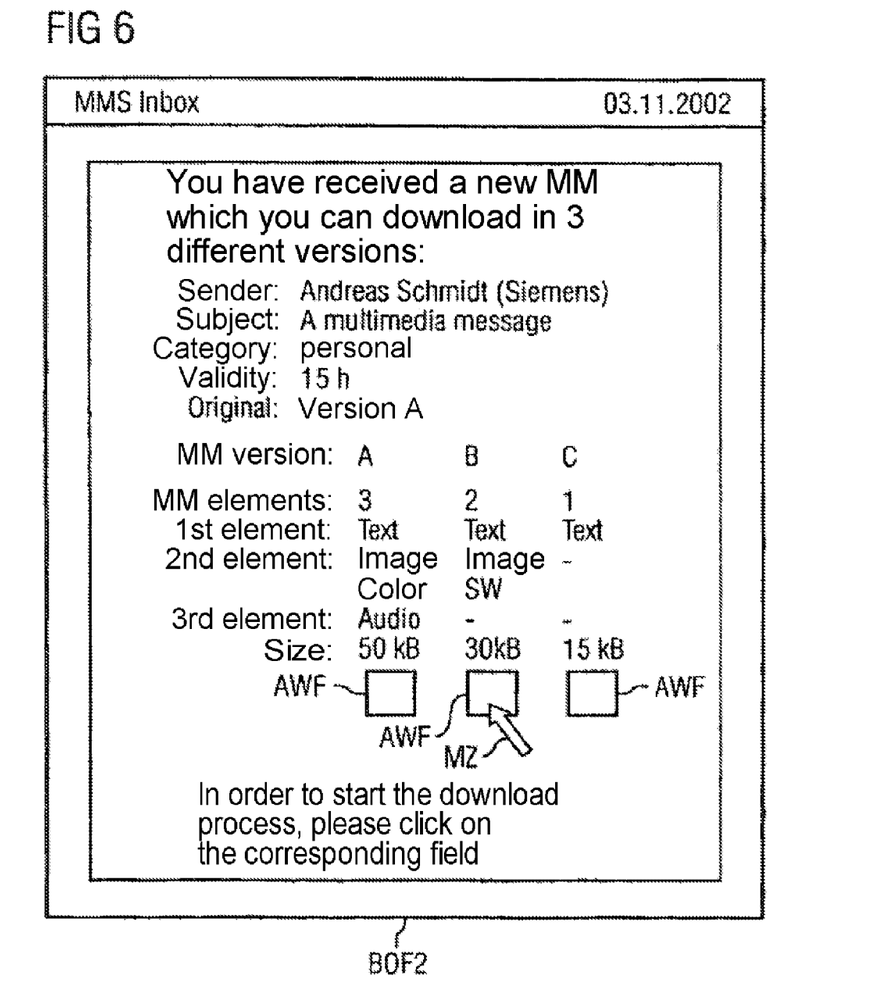
FIG. 6 shows a section of a user interface of a telecommunication device for displaying the options or information provided in recipient notification messages according to a second embodiment.

If detailed MMS recipient notifications are used, other information that may be contained in an MMS recipient notification is advantageously also displayed to the user, as shown in FIG. 6, on a second user interface BOF2 of the receive device (for example the mobile radio device MFG2 in FIG. 3). As well as the information already shown in FIG. 5, it is also displayed that there is a multimedia message with three alternative variants or download options in the MMS inbox dated Mar. 11, 2002, with additional details of which variant is the original variant and which multimedia message elements are provided in the multimedia message variants available on the MMS relay server. One or more required variants or download options can be selected by pressing the corresponding key on a keypad of the receive device or by selecting a corresponding selection surface AWF by means of a mouse pointer MZ and correspondingly confirming the selection.

It should be understood that the various changes and modifications to the presently preferred embodiments described herein will be apparent to those skilled in the art. Such changes and modifications can be made without departing from the spirit and scope of the present disclosure and without diminishing its intended advantages. It is therefore intended that such changes and modifications be covered by the appended claims.

The invention claimed is:

1. A method for transmitting messages in a communication network, comprising:
   transmitting a transmission message containing one or more user data objects to a switching component for forwarding to a first telecommunication device;
   creating a plurality of variants of the one or more user data objects in the switching component as a function of one or more parameters; and
   transmitting a delivery request message to the first telecommunication device informing the first telecommunication device of the availability of the plurality of variants of the one or more user data objects that have been created by the switching component before transmitting the transmission message to the first telecommunication device.

2. The method according to claim 1, further comprising:
   selecting a specific variant of the one or more user data objects and transmitting said selection from the first telecommunication device to the switching component; and
   transmitting a delivery message containing the requested variant of the one or more user data objects from the switching component to the first telecommunication device.

3. The method according to claim 1, wherein the step of informing the first telecommunication device comprises:
   generating respective recipient notification messages assigned to a specific variant of the one or more user data objects; and
   transmitting the respective recipient notification messages from the switching component to the first telecommunication device.

4. The method according to claim 3, wherein at least one of the recipient notification messages is transmitted to the telecommunication device by WAP push.

5. The method according to claim 3, wherein the recipient notification messages, which are assigned to variants of user data objects of a specific transmission message, comprise specific standard identification information.

6. The method according to claim 5, wherein the recipient notification messages, which are assigned to variants of user data objects of a specific transmission message, further comprise total information, indicating the total number of recipient notification messages generated by the switching component for the variants of the one or more user data objects of a transmission message.

7. The method according to claim 5, wherein different recipient notification messages have sequence information, which contains the sequence of the variants of the one or more user data objects generated by the switching component.

8. The method according to claim 7, wherein the sequence information in the different recipient notification messages indicates which of the recipient notification messages relates to the unmodified original version of the at least one user data object or the transmission message.

9. The method according to claim 7, wherein the identification information and/or the total information and/or the sequence information is provided under a respectively independent header field in a recipient notification message.

10. The method according to claim 7, wherein the identification information and/or the total information and/or the sequence information together is coded in a recipient notification message.

11. The method according to claim 10, wherein the variants for transmission by the switching component are displayed on a user interface so that a user can select one or more variants and request transmission by the switching component.

12. The method according to claim 7, wherein the identification information and/or the total information and/or the sequence information is processed by the first telecommunication device on receipt of a respective recipient notification message.

13. The method according to claim 12, wherein the user data objects contain text information, audio information, video information, executable programs, software modules or a combination of such information.

14. The method according to claim 3, wherein the different recipient notification messages have differentiation information, which indicates whether a variant of a user data object assigned to a respective recipient notification message is the original variant contained in the transmission message or a modified variant.

15. The method according to claim 1, wherein the parameters include parameters with information about the individual characteristics of the telecommunication device and in particular about applications provided on the telecommunication device.

16. The method according to claim 1, wherein the parameters include parameters with information about the individual preferences of the recipient.

17. The method according to claim 1, wherein the parameters include parameters with descriptive information, which includes the significance of user data objects contained in the transmission message and/or the relationships between contained user data objects.

18. The method according to claim 1, wherein the transmission message is transmitted from a second telecommunication device to the switching component.

19. The method according to claim 18, wherein the transmission message, delivery request message, delivery message, and recipient notification messages are transmitted in the context of the multimedia messaging service between the first telecommunication device and the switching component and/or the second telecommunication device and the switching component.

20. The method according to claim 18, wherein the messages to and from the first telecommunication device and/or the second telecommunication device are sent via an air interface.

21. The method according to claim 18, wherein the first and/or second telecommunication device comprises a radio module.

22. The method according to claim 18, wherein messages to and from the first and/or second telecommunication device are transmitted by means of the WAP protocol WSP and/or the hypertext transfer protocol.

23. The method according to claim 1, wherein the first telecommunication device is part of a first telecommunication network.

24. The method according to claim 23, wherein the first telecommunication network is configured as a mobile radio network, operating according to the GSM, GPRS, EDGE, UMTS, or CDMA standard.

25. The method to claim 23, wherein the switching component is configured as part of a second telecommunication network coupled to the first telecommunication network, which operates under the hypertext transfer protocol.

26. The method according to claim 25, wherein the first and second telecommunication networks are coupled together by a WAP gateway.

27. The method according to claim 1, wherein the switching component is configured as an MMS relay server.

28. A method for transmitting messages in a communication network, comprising:
    transmitting a transmission message containing one or more user data objects to a switching component, wherein the switching component is operable to forward the transmission message to a first telecommunication device selected from a plurality of different telecommunication devices;
    creating a plurality of variants of the one or more user data objects in the switching component as a function of one or more parameters, wherein the plurality of variants includes an unaltered version of the one or more user data objects; and
    before transmitting the transmission message to said first telecommunication device, transmitting a delivery request message to the first telecommunication device by the switching component informing the first telecommunication device of the availability of all variants of the one or more user data objects that have been created by the switching component.

29. A system for transmitting messages in a communication network, comprising:
    a switching component receiving a transmission message containing one or more user data objects for forwarding to a first telecommunication device;
    wherein the switching component is operable to create a plurality of variants of the one or more user data objects as a function of one or more parameters, wherein the plurality of variants includes an unaltered version of the one or more user data objects; and
    wherein the switching component is further operable to transmit a delivery request message to the first telecommunication device informing the first telecommunication device of the availability of the plurality of variants of the one or more user data objects before transmitting the transmission message to the first telecommunication device.

30. A telecommunication device for transmitting and receiving messages in a communication network, wherein the telecommunication device is operable:
    to receive a delivery request message from a switching component, wherein the switching component is operable to receive a transmission message containing one or more user data objects for forwarding to the telecommunication device, wherein the switching component is furthermore operable to create a plurality of variants of the one or more user data objects as a function of one or more parameters, and to transmit the delivery request message to the telecommunication device informing the telecommunication device of the availability of the plurality of variants of the one or more user data objects that have been created by the switching component before transmitting the transmission message to the first telecommunication device,
    to select at least one of said variants, and
    to receive a delivery message containing the requested at least one variant of the one or more user data objects from the switching component.

* * * * *